United States Patent Office 3,219,833
Patented Nov. 23, 1965

3,219,833
APPARATUS FOR ENCODING VOLTAGES SUPPLIED BY THERMOCOUPLES
Peter G. Davey, Berkeley, Calif., assignor to The General Electric Company Limited, London, England
Filed Oct. 9, 1961, Ser. No. 143,808
Claims priority, application Great Britain, Oct. 31, 1960, 37,337/60
8 Claims. (Cl. 307—81)

This invention relates to electric circuit arrangements of the kind comprising a switching circuit which is arranged to be supplied with periodically recurring control pulses and which is arranged to provide a signal at its output terminals that is dependent upon the voltage between its input terminals in response to each control pulse.

It is an object of the present invention to provide an improved electric circuit arrangement of the kind specified.

According to the present invention, in an electric circuit arrangement of the kind comprising a switching circuit which is arranged to be supplied with periodically recurring control pulses and which is arranged to provide a signal at its output terminals that is dependent upon the voltage between its input terminals in response to each control pulse, and a voltage source which is connected to the input terminals of the switching circuit, the switching circuit comprises a transformer which provides direct current isolation between said input and output terminals and switching means which is connected in series with a winding of the transformer in a circuit that is between said input terminals and which is arranged to be rendered conducting by each control pulse, and the switching circuit and the voltage source are arranged so that during operation of the circuit arrangement no direct current path exists between either one of said input terminals and earth, the arrangement being such that spurious electric voltages that may occur, during operation, between earth and the connections to the input terminals have little, if any, effect upon the signal provided at said output terminals in response to the control pulses.

The voltage source may comprise two voltage generators which are arranged so that the voltages supplied thereby are applied differentially between the input terminals of the switching circuit. The series circuit comprising said switching means and said winding of the transformer, and at least one of the voltage generators may be screened electrostatically from said output terminals.

Preferably the said switching means comprises a transistor which has its emitter to collector path connected in series with the said winding of the transformer and which is arranged to have the control pulses applied between its base and either its emitter or collector electrode so that it is rendered conducting by each control pulse.

It may be arranged that the voltage developed between the emitter and collector electrodes of the transistor, when conducting, is backed off by an adjustable voltage so that, during operation, a voltage substantially equal to the voltage between said input terminals is applied across said winding of the transformer in response to each control pulse. Preferably one of the voltage generators is arranged to provide this adjustable voltage.

A second winding of the transformer may be connected directly between said output terminals.

In a preferred arrangement the output voltage of one of the voltage generators may have any value within a predetermined voltage range and the other voltage generator is arranged so that its output voltage is adjustable to any one of a plurality of discreet values in that predetermined voltage range.

One example of an electric circuit arrangement in accordance with the present invention will now be described with reference to the two figures of the accompanying drawings in which.

Figure 1:
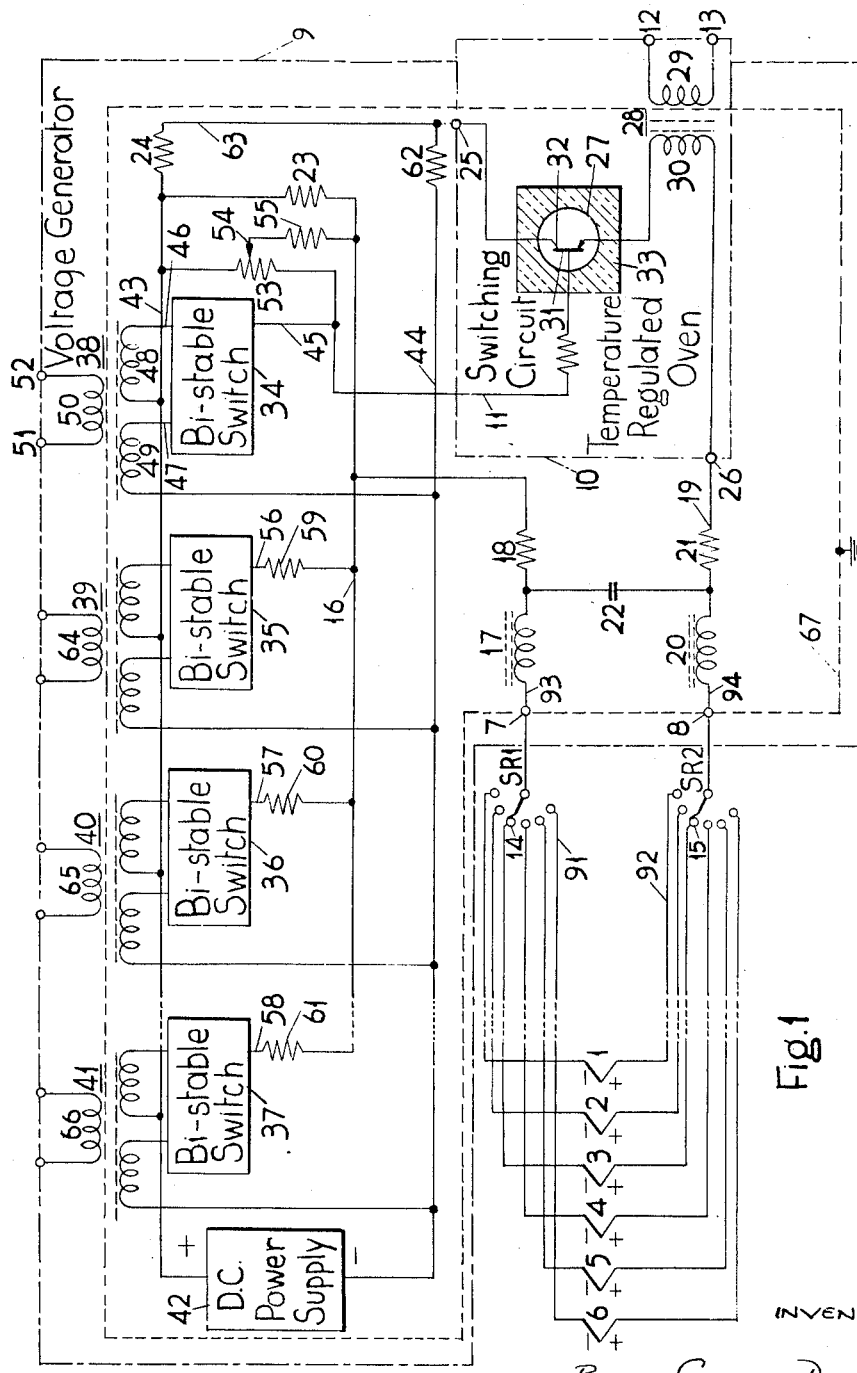
FIGURE 1 shows the electric circuit arrangement diagramamtically.

Referring to FIGURE 1, the electric circuit arrangement comprises a plurality of thermocouples 1 to 6 which are arranged to be connected selectively one at a time across a pair of terminals 7 and 8, a voltage generator 9 which is arranged to provide an analogue voltage that is variable in steps of predetermined amplitude and a four-terminal siwtching circuit 10 which is supplied over a conductor 11 with periodically recurring control pulses and which is arranged to provide at its output terminals 12 and 13 an indication of the sense of the difference between the said analogue voltage and the voltage between the terminals 7 and 8 in response to each control pulse.

The circuit arrangement forms part of a coding apparatus (not shown) which is for encoding the output voltages of the thermocouples 1 to 6 selectively one at a time and in which, during a coding sequence, the value of the said analogue voltage is modified until it is substantially equal to the output voltage of a selected one of the thermocouples.

In the present circuit arrangement, the selective connection of the thermocouples 1 to 6 across the terminals 7 and 8 is facilitated by means of a uniselector switch SR of which gold plated wipers SR1 and SR2 are connected to the terminals 7 and 8 respectively. Each of the thermocouples 1 and 6 is connected between a different one of the gold plated contacts 14 and the like that are associated with the wiper SR1 and the corresponding one of the gold plated contacts 15 and the like that are associated with the wiper SR2. In the voltage generator 9 the terminal 7 is connected to a conductor 16 by way of an inductor 17 and a resistor 18 while the terminal 8 is connected to a conductor 19 by way of an inductor 20 and a resistor 21. The inductors 17 and 20 together with an associated capacitor 22 comprise a smoothing circuit which prevents the occurrence of sudden changes in the value of voltage between the conductors 16 and 19. Such voltage changes would otherwise occur during stepping of the wipers SR1 and SR2 when a thermocouple 1, 2, 3, 4, 5 or 6 is selected that has an appreciably different output voltage to the thermocouple previously connected between the terminals 7 and 8.

The conductor 16 has one end of a resistor 23 connected thereto. This resistor 23 has its other end connected by way of a resistor 24 to one input terminal 25 of the switching circuit 10. The other input terminal 26 of the switching circuit 10 is connected to the conductor 19. Thus a circuit comprising the resistor 23 in series with any selected one of the thermocouples 1 to 6 is connected across the input terminals 25 and 26 of the switching circuit 10. The voltage generator 9 is arranged, as will be hereinafter described, so that the analogue voltage is set up across the resistor 23 and is of the opposite polarity to the output voltages of the thermocouples 1 to 6 that occur between the terminals 7 and 8. Thus the output voltage of any selected thermocouple 1, 2, 3, 4, 5 or 6 and the analogue voltage are arranged to be applied differentially between the input terminals 25 and 26 of the switching circuit 10, that is to say, the voltage applied between those input terminals 25 and 26 corresponds in amplitude to the difference between the said output voltage and the said analogue voltage while its sense indicates which of those two voltages is the greater.

The switching circuit 10 comprises a p–n–p type junction transistor 27 and a transformer 28 which has its secondary winding 29 connected between the output terminals 12 and 13 of the switching circuit and which has its primary winding 30 connected in series with the emitter to collector path of the transistor 27 in a circuit that extends between the input terminals 25 and 26 of the switching circuit. There is no direct current path between the two windings 29 and 30 of the transformer 28 which thus provides direct current isolation between the input terminals 25 and 26 and the output terminals 12 and 13 of the switching circuit 10. The said control pulses are applied between the base 31 and the collector electrode 32 of the transistor 27. The transistor 27 is contained within a temperature regulated oven 33 whereby, during operation, its temperature is maintained automatically at a substantially constant value.

The voltage generator 9 comprises a plurality of bistable switches of which only the switches 34, 35, 36 and 37 are shown, a plurality of pulse transformers of which only the transformers 38, 39, 40 and 41 associated respectively with the switches 34, 35, 36 and 37 are shown and a direct current power supply 42 whereby a voltage stabilised at ten volts is applied between positive and negative supply lines 43 and 44. Each bistable switch, for example, the switch 34 has an output lead 45 and two input leads 46 and 47 of which the input lead 46 is connected through one secondary winding 48 of the associated pulse transformer 38 to the positive supply line 43 and the input lead 47 is connected through another secondary winding 49 of that transformer 38 to the negative supply line 44.

The transformer 38, like each of the other transformers 39, 40, 41 and the like, has a primary winding 50 connected between an associated pair of terminals 51 and 52 and is arranged so that the associated bistable switch 34 is driven from one of its stable conditions, hereinafter referred to as the "off" condition to the other of those conditions, hereinafter referred to as the "on" condition, in response to a current pulse of predetermined sense that is supplied to the terminals 51 and 52 and is driven from its "on" condition to its "off" condition in response to a current pulse of the opposite sense that is supplied to those terminals. The bistable switch 34, like each of the other bi-stable switches 39, 40, 41 and the like, is arranged so that in its "off" condition it provides a low resistance path between its input lead 46 and its output lead 45 and its "on" condition it provides a low resistance path between its input lead 47 and its output lead 45.

The bistable switch 34 has its output lead 45 connected both to the conductor 11 and to the positive supply line 43 by way of the fixed resistance portion of a variable potentiometer 53. The adjustable tapping 54 of this potentiometer 53 is connected through a resistor 55 to the conductor 16. Each of the other bistable switches 39, 40, 41 and the like has its output lead 56, 57, 58 or the like connected to the conductor 16 by way of an individual high stability resistor 59, 60, 61 or the like of predetermined value which is different for each of those switches.

A potential divider formed by the resistor 24 in series with a resistor 62 is connected between the positive and negative supply lines 43 and 44. The connection 63 between these two resistors 24 and 62 is connected to the input terminal 25 of the switching circuit 10.

The whole of the voltage generator 9 excepting the primary windings 50, 64, 65, 66 and the like of the transformers 38, 39, 40, 41 and the like and the whole of the switching circuit 10 excepting the secondary winding 29 of the transformer 28 are contained within an earthed metal box 67. The voltage generator 9, the thermocouples 1 to 6 and the switching circuit 10 are arranged so that there is no direct current path between either input terminal 25 or 26 of the switching circuit and earth.

Figure 2:
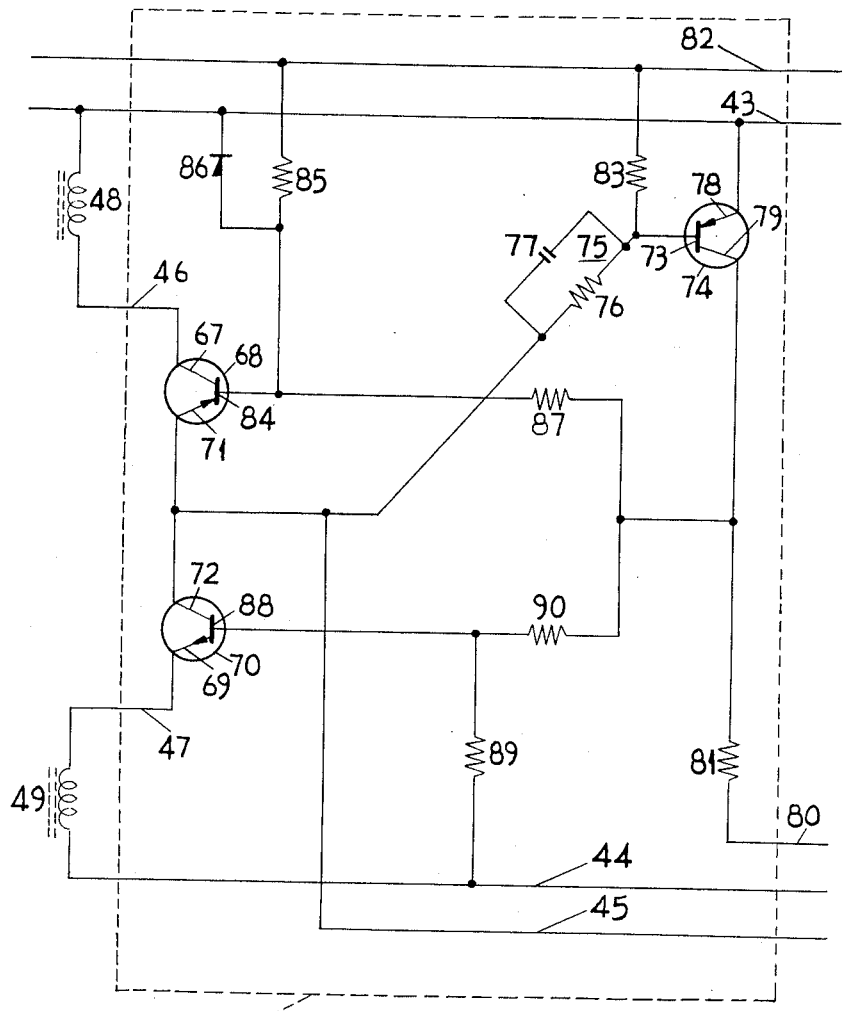
FIGURE 2 shows the electric circuit of a bistable switch which is employed in the circuit arrangement and which is represented in block form in FIGURE 1.

Each of the bistable switches 34, 35, 36, 37 and the like has an identical electric circuit. Therefore only the circuit of the switch 34 will be described, this being shown in FIGURE 2 to which reference should now be made.

The input lead 46 of the bistable switch 34 is connected to the collector electrode 67 of a p-n-p type junction transistor 68 while the input lead 47 of this switch is connected to the emitter elecrode 69 of an n-p-n type junction transistor 70. The output lead 45 of the bistable switch 34 is connected directly to both the emitter electrode 71 of the transistor 68 and the collector electrode 72 of the transistor 70. The output lead 45 is also connected to the base electrode 73 of a p-n-p type junction transistor 74 by way of a network 75 comprising a resistor 76 in parallel with a capacitor 77. This transistor 74 has its emitter elecrode 78 connected directly to the positive supply line 43 while its collector electrode 79 is connected to a supply line 80 by way of a resistor 81. Its base electrode 73 is connected to another supply line 82 by way of a resistor 83. The supply lines 80 and 82 are connected to the power supply 42 whereby they are arranged to be maintained respectively at voltages which are 20 volts negative and 5.6 volts positive to the voltage of the positive supply line 43.

The transistor 68 has its base electrode 84 connected to the supply line 82 by way of a resistor 85 and to the supply line 43 by way of a rectifier element 86 which is poled so that this base electrode is prevented from attaining a more positive voltage than the supply line 43. A resistor 87 is connected between the base electrode 84 of the transistor 68 and the collector electrode 79 of the transistor 74. The transistor 70 has its base electrode 88 connected to the negative supply line 44 by way of a resistor 89 and to the collector electrode 79 of the transistor 74 by way of a resistor 90. The resistors 85, 87, 90 and 89 form a potential divider between the supply lines 82 and 44. These resistors 85, 87, 89 and 90 and the resistor 81 have values such that when the transistor 74 is cut-off the voltages of the base electrodes 84 and 88 are such that the transistor 68 is bottomed and he transistor 70 is cut-off, this corresponding to the "off" condition of the bistable switch 34, while when the transistor 74 is bottomed the transistor 68 is cut-off and the transistor 70 is bottomed, his corresponding to the "on" condition of the switch.

When the bistable switch 34 is in its "off" condition, the output lead 45 is at about the same voltage as the input lead 46 as there is substantially no voltage drop across the emitter to collector path of the transistor 68. The emitter current of the transistor 68 flows through the resistors 76 and 83 which have values such that the resulting base electrode voltage of the transistor 74 is sufficiently positive with respect to its emitter electrode voltage to maintain this transistor 74 in its cut-off state.

When a current pulse is supplied to the primary winding 50 (FIGURE 1) of the associated pulse transformer 38 of a sense such that the effect of the resulting pulses induced in the secondary windings 48 and 49 is to reduce the flow of current through the emitter-collector path of the transistor 68 and initiate the flow of current through the emitter-collector path of the transistor 70, the voltage of the output lead 45 falls appreciably. There is a corresponding reduction in the base electrode voltage of the transistor 74 which is driven into conduction. The resulting changes in the values of the voltages applied to the base electrodes 84 and 88 cause the transistor 68 to be cut-off and the transistor 70 to be bottomed. Thus the bistable switch 34 is driven to its "on" condition and the output lead 45 attains substantially the same voltage as the input lead 47.

Upon the supply of a current pulse of the opposite sense to the primary winding 50 (FIGURE 1) of the pulse transformer 38 the flow of emitter to collector current through the transistor 70 is reduced appreciably while the transistor 68 is caused to conduct. The resulting increase in the voltage of the output lead 45 causes the transistor 74 to cut-off whereupon the base electrodes 84 and 88 of the transistors 68 and 70 acquire values of voltage such that the transistor 68 is bottomed and the transistor 70 is cut-off. Thus the bistable switch 34 once more attains its "off" condition.

During operation of the coding apparatus (not shown) of which the circuit arrangement of FIGURE 1 forms part, the resistors 59, 60 61 and the like are connected in series with the resistor 23 between the supply lines 43 and 44 in sequence commencing with the resistor 59 which is of smallest value and ending with the resistor 61 which is of largest value. Thus the primary windings 64, 65, 66 and the like of the transformers 39, 40, 41 and the like are each supplied in turn with an electric current pulse of the particular sense that results in the associated one of the bistable switches 35, 36, 37 and the like being driven into its "on" condition. In this way the value of the analogue voltage set up across the resistor 23 is varied in steps of diminishing amplitude.

After each change in the value of the analogue voltage the primary winding 50 of the transformer 38 is supplied with a current pulse of the particular sense which results in the bistable switch 34 being driven into its "on" condition so that the output lead 45 attains substantially the same voltage as the negative supply line 44. After a short interval of time a current pulse of the opposite sense is supplied to the primary winding 50 so that the bistable switch 34 is restored to its "off" condition and the output lead 45 re-attains substantially the same voltage as the positive supply line 43. In this way a control pulse comprising a voltage pulse is applied between the base 31 and collector electrode 32 of the transistor 27 in the switching circuit 10 and this transistor is bottomed for the duration of the pulse.

During the control pulse electric current flows from the positive supply line 43 to the negative supply line 44 through the collector to emitter path of the transistor 70 (FIGURE 2) in the bistable switch 34. Part of this current flows through the resistors 23 and 55 and the part of the potentiometer 53 between the tapping 54 and the conductor 11 and the remainder of this current flows through the whole of the potentiometer 53. The tapping 54 of the potentiometer 53 is adjusted so that the part of this current that flows through the resistor 23 gives rise to a value of voltage across this resistor that is substantially equal to the voltage developed between the collector and emitter electrodes of the now conducting transistor 27 in the switching circuit 10.

It is required to encode the values of the output voltages of the thermocouples 1 to 6 relative to the particular value obtained for each of those output voltages when the thermocouples are at a predetermined temperature. To this end the values of the resistors 24 and 62 are chosen so that the voltage developed across the resistor 24 is substantially equal to the said particular value of the output voltage of the thermocouples 1 to 6.

In the above manner it is arranged that the voltage applied across the primary winding 30 of the transformer 28 in the switching circuit 10 when the transistor 27 is conducting is equal to the actual difference between the analogue voltage and the value, relative to said particular value, of the output voltage of that one of the thermocouples 1 to 6 that is connected between the terminals 7 and 8.

Because of the voltage applied across the primary winding 30 of the transformer 28 a voltage is induced in the secondary winding 29 of this transformer, the sense of the resulting voltage difference between the output terminals 12 and 13 of the switching circuit 10 indicating which of the analogue voltage and the thermocouple output voltage is the larger. The coding apparatus is arranged to operate according to this indication so that the last effected change in the value of the analogue voltage is maintained only if it does not result in a larger value for the analogue voltage than for the said thermocouple output voltage.

When the bistable switch 34 is restored to its "off" condition, the control pulse is terminated and the transistor 27 cuts off. Thereupon the last affected one of the bistable switches 35, 36, 37 and the like is either left "on" or is switched "off" by means of a current pulse of the appropriate polarity supplied to the primary winding 64, 65, 66 and the like of its associated pulse transformer 39, 40, 41 or the like, and the next one of these bistable switches is caused to attain its "on" condition by means of a current pulse supplied to the primary winding of its associated pulse transformer.

The cycle of operations described above is repeated and, after a number of such cycles which constitutes a coding sequence, the analogue voltage is, to the accuracy of coding, equal to the output voltage of the particular thermocouple 3 that is connected across the terminals 7 and 8 and the value of this output voltage is characterised by the particular combination of the resistors 59, 60, 61 and the like that are connected in series with the resistor 23 between the supply lines 43 and 44 by the bistable switches 35, 36, 37 and the like that are in their "on" condition.

During a coding sequence, the current pulses are supplied to the primary windings 64, 65, 66 and the like by a register (not shown) of the coding apparatus. In this connection, each of these primary windings 64, 65, 66 and the like is connected to a secondary winding of a different one of a plurality of pulse transformers (not shown) in the register that each has two secondary windings connected in circuit with an associated one of a plurality of bi-stable switches (not shown) in a similar manner to that in which the bistable switches 34, 35, 36 and 37 and the like are connected in circuit with the windings 48, 49 and the like. It is arranged that each of the bistable switches 34, 35, 36, 37 and the like always assumes the same condition "on" or "off" as its corresponding bistable switch in the register. The bistable switches in the register are arranged to be switched "on" in turn during a coding sequence by an associated sequence controller (not shown) comprising a pulse counting chain wherein the counting stages consist of bistable switches and a multivibrator or other suitable pulse generator which supplies regularly recurring pulses for operating the counting chain.

In addition to the register (not shown) and the sequence controller (not shown) the coding apparatus comprises a balance detector (not shown) which is connected to the output terminals 12 and 13 of the switching circuit 10 and a register control circuit (not shown) which is connected between the balance detector and the register. The balance detector comprises an amplifier to amplify the voltage that appears between the terminals 12 and 13 during a control pulse and a bistable switch which is arranged to assume a different one of its "on" and "off" conditions for each sense of amplified voltage applied thereto by the amplifier. The register control circuit is arranged so that subsequent to a control pulse it causes the particular bistable switch in the register that was switched "on" immediately before that control pulse to be switched "off" only if the indication then provided by the condition of the bistable switch in said balance detector corresponds to the said analogue voltage being greater than the output voltage of the selected one of the thermocouples 1 to 6.

The thermocouples 1 to 6 are situated at a distance from the terminals 7 and 8 and it is found that the connections 91, 92 and the like between these terminals and the selected one of the thermocouples pick up spurious signals. Since these spurious signals usually have common origins they give rise to noise voltages between the terminals 7 and 8 and earth potential that have substantially equal instantaneous values of the same polarity. As previously mentioned, in the circuit arrangement no direct current path exists between either input terminal 25 or 26 of the switching circuit 10 and earth potential. Consequently the said noise voltages are differentially applied to those input terminals 25 and 26 so that they have substantially no effect upon the indications obtained at the output terminals 12 and 13 of the switching circuit 10 when its transistor 27 is rendered conducting. Because of this a true indication of the sense of the difference between the said analogue voltage and the output voltage of the selected one of the thermocouples 1 to 6 can be obtained at the output terminals 12 and 13 even when the value of the voltage difference is comparable to, or even less than, the values of these noise voltages.

Inductive an capacitive coupling of the said noise voltages to the output terminals 12 and 13 of the switching circuit 10 is substantially eliminated by means of the electrostatic screening which is provided by the earthed metal box 67.

It has been found in practice that the level of the noise voltages which appear between the output terminals 12 and 13 when the transistor 27 in the switching circuit 10 is conducting depends upon the total resistance of the loop circuit comprising the selected one of the thermocouples 1 to 6, the resistors 23 and 24 and the switching circuit 10 and that there is a particular value for this total resistance at which the level of these noise voltages is a minimum. The resistors 18 and 21 are included in said loop circuit to obtain this particular value of resistance which, for the arrangement described above, is about 1,000 ohms. The relative values of the resistors 18 and 21 have to be chosen empirically and depend upon the relative stray capacitance coupling between each of the conductors 93 and 94 and the earthed metal box 67.

I claim:

1. In apparatus which is for encoding the voltage supplied by a first voltage generator and which also includes a second voltage generator, means to derive a difference voltage equal to the difference between the voltages supplied by the first and second voltage generators, an electric circuit arrangement to which said difference voltage is supplied, voltage responsive means which is responsive to the voltage supplied by said circuit arrangement, means to derive a coded output signal from said voltage responsive means, and alternating current means coupling said voltage responsive means and the second voltage generator, whereby said second voltage generator is controlled, during a coding cycle, so as progressively to reduce in steps the magnitude of said difference voltage, said circuit arrangement comprising switching means, a transformer having a primary winding and a secondary winding, means connecting in series said switching means and the primary winding of said transformer, means to apply the difference voltage across the series connected switching means and transformer primary winding, means connecting the secondary winding of the transformer to the input of said voltage responsive means, and a source of periodically recurring control pulses connected to said switching means so that upon occurrence of each control pulse the difference voltage is effectively developed across said primary winding and the voltage then developed across the secondary winding constitutes the said voltage supplied to said voltage responsive means.

2. An electric circuit arrangement according to claim 1 wherein the series circuit comprising said switching means and said primary winding of the transformer, and at least one of the voltage generators are screened electrostatically from said output terminals.

3. An electric circuit arrangement according to claim 1 wherein said first voltage generator comprises a plurality of thermocouples and selecting means operable to select any one of those thermocouples, the arrangement being such that the output voltage of this voltage generator is provided by the selected one of the thermocouples.

4. An electric circuit arrangement according to claim 1 wherein said second voltage generator comprises a load resistance across which the output voltage of the generator is obtained and a plurality of bistable switches which are arranged to be controlled by electric pulses and each of which is arranged so that in one stable condition thereof it connects associated resistance of predetermined value in parallel with said load resistance and in the other stable condition thereof it connects said associated resistance in series with said load resistance across a direct current supply of predetermined voltage.

5. An electric circuit arrangement according to claim 3 wherein it is arranged that the voltage which, during operation, is applied in opposition to the output voltage of said second voltage generator between the input terminals of the switching circuit comprises the voltage provided by any selected thermocouple reduced by an amount which is substantially equal to the voltage provided by that thermocouple at a predetermined temperature.

6. An electric circuit arrangement according to claim 1 wherein said switching means comprises a transistor which has its emitter to collector path connected in series with the said winding of the transformer and which is arranged to have the control pulses applied between its base and collector electrodes so that it is rendered conducting by each control pulse.

7. An electric circuit arrangement according to claim 6 wherein there are provided a resistive impedance connected in series with the emitter-collector path of the transistor and means to develop across said impedance a voltage of such sense and magnitude as to oppose the voltage developed between the emitter and collector electrodes of the transistor, when conducting.

8. An electric circuit arrangement according to claim 7 wherein said means to develop said voltage across said impedance forms part of said other voltage generator.

References Cited by the Examiner
UNITED STATES PATENTS

| | | | |
|---|---|---|---|
| 2,579,302 | 12/1951 | Carbrey | 340—347 |
| 2,754,503 | 7/1956 | Forbes | 340—347 |
| 2,762,038 | 9/1956 | Lubkin | 324—99 |
| 2,922,151 | 1/1960 | Reiling | 340—347 |
| 2,996,669 | 8/1961 | Morgan et al. | 324—99 |
| 3,072,846 | 1/1963 | Belcher | 324—99 |

LLOYD McCOLLUM, *Primary Examiner.*